(12) United States Patent
Stercl et al.

(10) Patent No.: US 12,358,072 B2
(45) Date of Patent: Jul. 15, 2025

(54) BURNING APPARATUS FOR RAILWAY REPAIR

(71) Applicant: GOLDSCHMIDT HOLDING GMBH, Leipzig (DE)

(72) Inventors: Johannes Stercl, Leipzig (DE); Martin Niederkrüger, Leipzig (DE)

(73) Assignee: GOLDSCHMIDT HOLDING GMBH, Leipzig (DE)

( * ) Notice: Subject to any disclaimer, the term of this patent is extended or adjusted under 35 U.S.C. 154(b) by 143 days.

(21) Appl. No.: 18/251,308

(22) PCT Filed: Oct. 27, 2021

(86) PCT No.: PCT/EP2021/079864
§ 371 (c)(1),
(2) Date: May 1, 2023

(87) PCT Pub. No.: WO2022/096346
PCT Pub. Date: May 12, 2022

(65) Prior Publication Data
US 2024/0001482 A1   Jan. 4, 2024

(30) Foreign Application Priority Data
Nov. 5, 2020   (EP) .................................... 20205851

(51) Int. Cl.
| F23D 14/36 | (2006.01) |
| B23K 23/00 | (2006.01) |
| E01B 29/44 | (2006.01) |
| E01B 31/18 | (2006.01) |
| F23D 14/40 | (2006.01) |
| B23K 101/26 | (2006.01) |

(52) U.S. Cl.
CPC .............. *B23K 23/00* (2013.01); *E01B 29/44* (2013.01); *E01B 31/18* (2013.01); *F23D 14/36* (2013.01); *F23D 14/40* (2013.01); *B23K 2101/26* (2018.08)

(58) Field of Classification Search
CPC ..... B23K 23/00; B23K 2101/26; E01B 29/44; E01B 31/18; F23D 14/36; F23D 14/40
USPC ......................................................... 431/351
See application file for complete search history.

(56) References Cited

U.S. PATENT DOCUMENTS

| 3,894,526 | A | * | 7/1975 | Kofink | B60H 1/2212 |
| | | | | | 126/110 B |
| 4,726,767 | A | * | 2/1988 | Nakajima | F23D 14/36 |
| | | | | | 431/255 |
| 4,942,863 | A | * | 7/1990 | Chou | F24H 9/18 |
| | | | | | 126/110 E |
| 5,232,153 | A | * | 8/1993 | Mohring | F24H 9/0026 |
| | | | | | 126/110 B |
| 6,474,981 | B1 | * | 11/2002 | Morgan | F23D 11/001 |
| | | | | | 417/423.1 |

(Continued)

*Primary Examiner* — Avinash A Savani
(74) *Attorney, Agent, or Firm* — Kramer & Amado, P.C.

(57) ABSTRACT

The present invention relates to a burning apparatus for railway repair, defining an axis (P) and comprising: an air compressor assembly (2) including an inlet opening (20) and an outlet opening (21), and a combustion assembly (3) connected to the outlet opening (21) of the air compressor assembly (2), wherein the air compressor assembly (2) and the combustion assembly (3) are axially disposed along the axis (P), and wherein the air compressor assembly (2) compresses air into the combustion assembly (3).

22 Claims, 14 Drawing Sheets

(56) References Cited

U.S. PATENT DOCUMENTS

| | | | | |
|---|---|---|---|---|
| 8,201,551 | B1* | 6/2012 | Lee, Jr. | F24H 3/0488 |
| | | | | 126/110 B |
| 9,267,704 | B1* | 2/2016 | Lee, Jr. | F24H 3/02 |
| 2001/0030241 | A1* | 10/2001 | Kott | B05B 7/166 |
| | | | | 239/303 |
| 2002/0117164 | A1* | 8/2002 | Story | F23D 14/38 |
| | | | | 126/271.1 |
| 2009/0241943 | A1* | 10/2009 | Schwank | F24C 3/08 |
| | | | | 126/91 A |
| 2011/0183274 | A1* | 7/2011 | Bahn | F23D 11/408 |
| | | | | 431/2 |

* cited by examiner

BURNING APPARATUS FOR RAILWAY REPAIR

TECHNICAL FIELD

The present invention relates to a burning apparatus for railway repair, more particularly for aluminothermic welding.

BACKGROUND ART

At the end of the nineteenth century, aluminothermic welding was invented to weld rail tracks with the development of the metallurgical and chemical industries. To prepare aluminothermic welding for connecting two rail ends, a welding operator should heat the end faces of these rail ends opposite each other in the welding gap. This heating process aims to remove any moisture that may exist in a welding mold. Furthermore, increasing the temperature of the rail ends can slow down the cooling of the heated weld. In this way, a welding operator can obtain a desired certain metallic structure in the welding gap. However, when working at the railway tracks, a welding operator takes much effort and energy to move a conventional preheating burner equipped with an air compressor on and off the railway tracks. The conventional preheating burner is comparatively huge and heavy because the air compressor is usually disposed on the side of the preheating burner. Thus, a conventional preheating burner does not provide a thinner and lighter burning apparatus for railway repair.

TECHNICAL PROBLEM TO BE SOLVED

The objective of the present invention is to provide a burning apparatus for railway repair, and more particularly a burning apparatus that provides a thinner and lighter burning apparatus for railway repair.

SUMMARY OF THE INVENTION

The following summarizes some aspects of the present invention to provide a basic understanding of the technology discussed. This summary is not an extensive overview of all contemplated features of the invention, and is intended neither to identify key or critical elements of all aspects of the invention nor to delineate the scope of any or all aspects of the invention. Its sole purpose is to present some concepts of one or more aspects of the invention in a summary form as a prelude to the more detailed description that is presented later.

A first aspect of the present invention provides a burning apparatus for railway repair, defining an axis and comprising: an air compressor assembly including an inlet opening and an outlet opening, and a combustion assembly connected to the outlet opening of the air compressor assembly, wherein the air compressor assembly and the combustion assembly are axially disposed along the axis, and wherein the air compressor assembly compresses air into the combustion assembly.

In a second aspect of the present invention according to the first aspect, wherein the air compressor assembly further comprises: a body axially disposed along the axis, a motor including a motor shaft and disposed in the body, and a propeller driven by the motor through the motor shaft and guiding air into the body.

In a third aspect of the present invention according to the second aspect, wherein the body comprises: an outer housing, and an inner housing disposed in the outer housing and connected to the outer housing, the motor disposed therein, wherein the inner housing and the outer housing defining an air passage therebetween, and the propeller guides air from the air compressor assembly into the combustion assembly through the air passage.

In a fourth aspect of the present invention according to the third aspect, wherein the body further includes a rib connecting between the outer housing and the inner housing in the air passage.

In a fifth aspect of the present invention according to any one of the first to fourth aspects, wherein the air compressor assembly further comprises a hood configured for guiding air into the inlet opening of the air compressor assembly.

In a sixth aspect of the present invention according to any one of the first to fourth aspects, wherein the air compressor assembly further comprises: a plastic mounting plate receiving the propeller and disposed between the hood and the body, and a metal mounting plate disposed between the plastic mounting plate and the body to strengthen the air compressor assembly.

In a seventh aspect of the present invention according to any one of the third and fourth aspects, wherein the inner housing of the body includes an inner housing opening which allows air to flow from the air passage into the inner housing for cooling the motor.

In an eighth aspect of the present invention according to any one of the first to fourth aspects, wherein the combustion assembly includes: a combustion assembly housing including an inlet opening and an outlet opening, the inlet opening of the combustion assembly housing communicating with the outlet opening of the air compressor assembly, a fuel means for providing fuel into the combustion assembly, and an ignition means for igniting fuel, wherein the ignition means ignites the fuel in the combustion assembly to produce a flame.

In a ninth aspect of the present invention according to the eighth aspect, wherein the combustion assembly further includes a burning tube assembly disposed in the combustion assembly housing, the burning tube assembly comprising: an inlet disc, an outlet disc, and a burning tube body configured to be hollow and disposed along the axis in the combustion assembly housing and between the inlet disc and the outlet disc, wherein the burning tube body and the combustion assembly housing define an air channel therebetween, and wherein the air passage of the air compressor assembly, the air channel of the combustion assembly, the burning tube body, and the outlet opening of the combustion assembly are designed to be communicated.

In a tenth aspect of the present invention according to the ninth aspect, wherein the burning tube body includes openings designed along the burning tube body to control the amount of air entering from the air channel into the burning tube body, wherein the combustion of the mixture of the fuel and air happens in the burning tube body.

In an eleventh aspect of the present invention according to the tenth aspect, wherein the openings of the burning tube body closer to the inlet disc are designed to be smaller than the openings of the burning tube body closer to the outlet disc.

In a twelfth aspect of the present invention according to the eighth aspect, wherein the combustion assembly includes a sensor for monitoring and detecting the presence of flame.

In a thirteen aspect of the present invention according to the eighth aspect, wherein the fuel means is connected to a fuel providing device, and the ignition means is connected to an electrical device.

In a fourteenth aspect of the present invention according to the fifth aspect, wherein the body of the air compressor assembly is constructed as integral, and the hood and the body are constructed as integral.

In a fifteenth aspect of the present invention according to any of the first to fourteenth aspects, wherein the air compressor assembly and the combustion assembly are constructed as integral.

A sixteenth aspect of the present invention provides a preheating device for railway repair, comprising: a preheating device body, and the burning apparatus of any of the first to fifteenth aspects disposed in the preheating device, wherein the preheating device is operated on the railway tracks to heat the railway.

Advantageously, the present invention aims to provide a thinner and lighter burning apparatus for railway repair and cooling the combustion assembly.

Further benefits and advantages of the present invention will become apparent after a careful reading of the detailed description with appropriate reference to the accompanying drawings.

DETAILED DESCRIPTION

Figure 1:
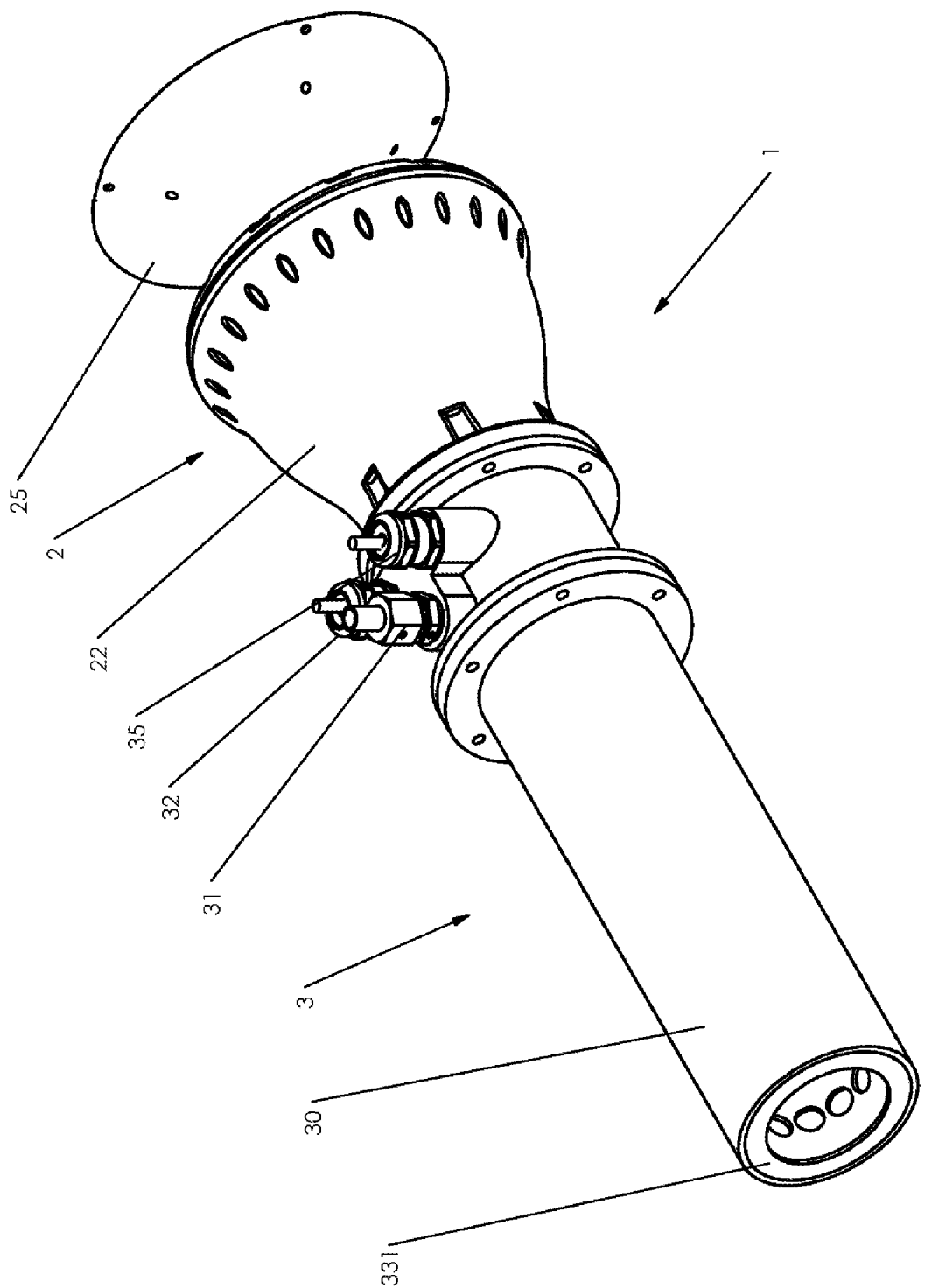
FIG. 1 is a perspective view of a burning apparatus for heating railway tracks in accordance with the preferred embodiment of the present invention.
Figure 2:
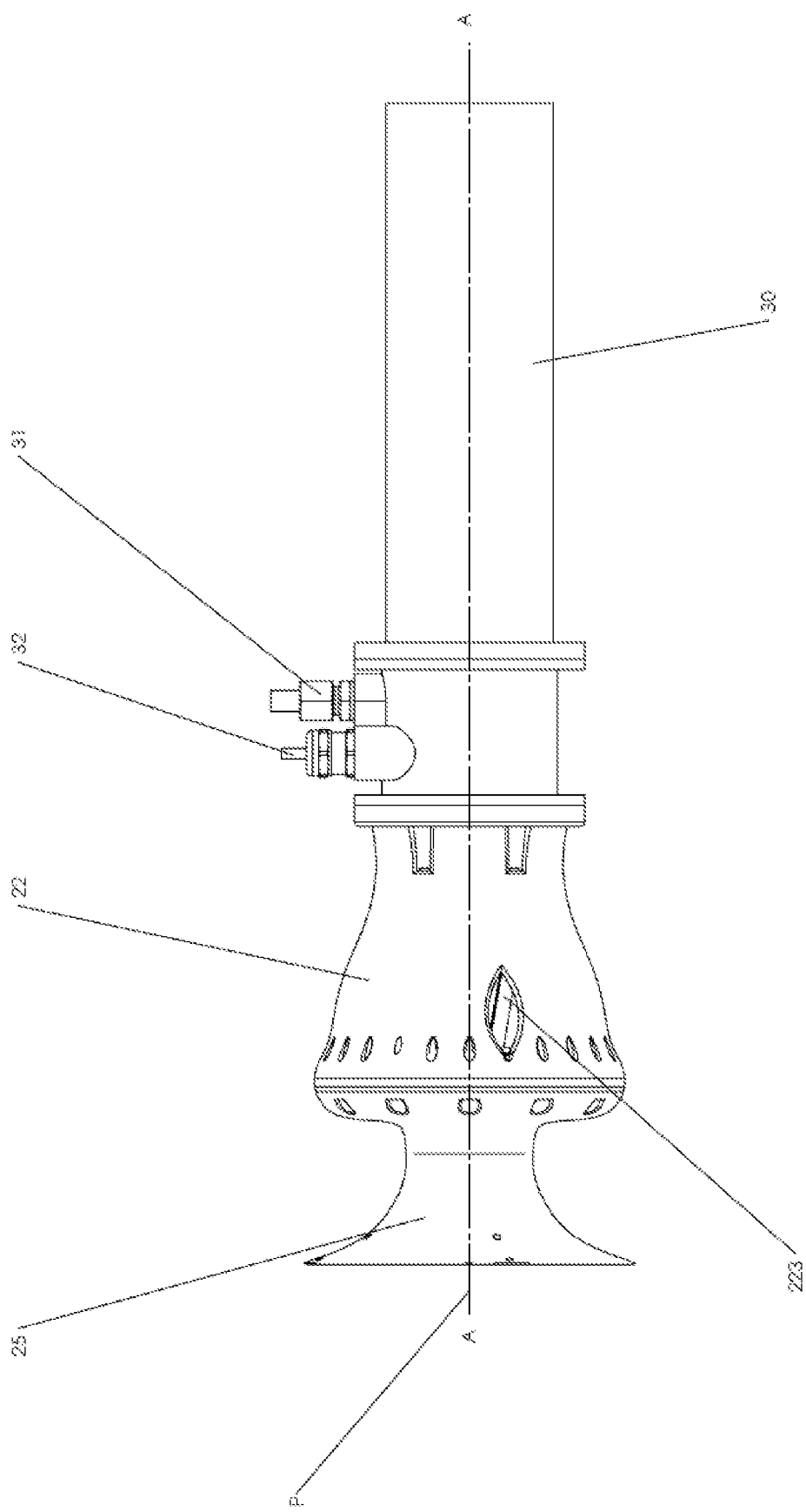
FIG. 2 is a side view of the burning apparatus of FIG. 1.

FIG. 1 is a perspective view of a burning apparatus for heating railway tracks in accordance with the preferred embodiment of the present invention. FIG. 2 is a side view of the burning apparatus of FIG. 1.

Please refer to FIGS. 1 and 2 together. A burning apparatus 1 is provided for railway repair, such as for heating the railway tracks or drying the molds during the aluminothermic welding process. Specifically, the burning apparatus 1 defines a longitudinal axis P and includes an air compressor assembly 2 and a combustion assembly 3. The air compressor assembly 2 is used for inhaling air and forcing air (with oxygen) into the combustion assembly 3 of the burning apparatus 1. The combustion assembly 3 is used for the reaction of combustion and for producing flames. The air compressor assembly 2 and the combustion assembly 3 are axially disposed along the axis P. During operation, the air compressor assembly 2 compresses air with oxygen into the combustion assembly 3, so the combustion assembly 3 can ignite the fuel and oxygen and produce a flame for railway repair. In a preferred embodiment, the temperature of a flame may be within the range of 500 and 2400 Celsius degrees for welding railways. The axial arrangement of the air compressor assembly 2 and the combustion assembly 3 makes the overall burning apparatus 1 thinner, smaller, and more symmetric. Thus, a welding operator can easily handle and operate the burning apparatus 1 at a railway construction site.

Figure 3:
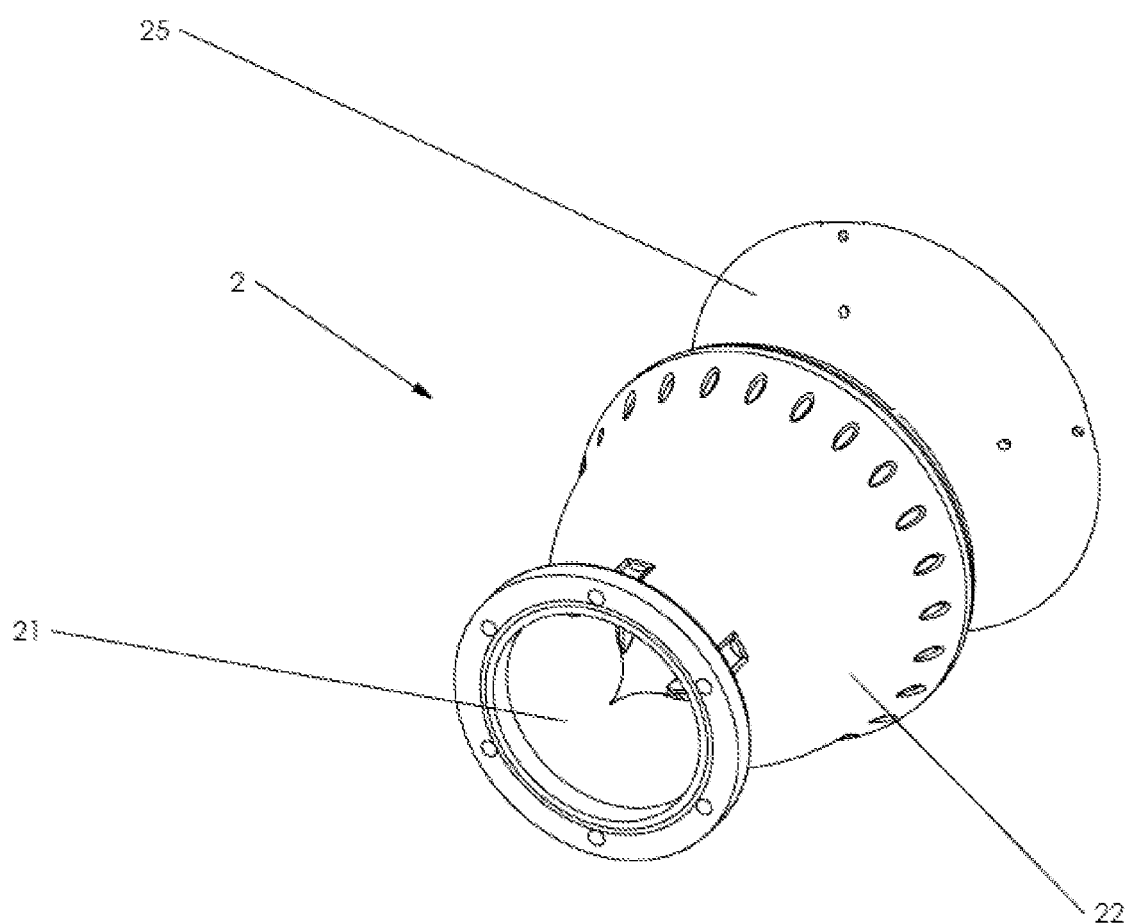
FIG. 3 is a perspective view of the air compressor assembly of FIG. 1.
Figure 4:
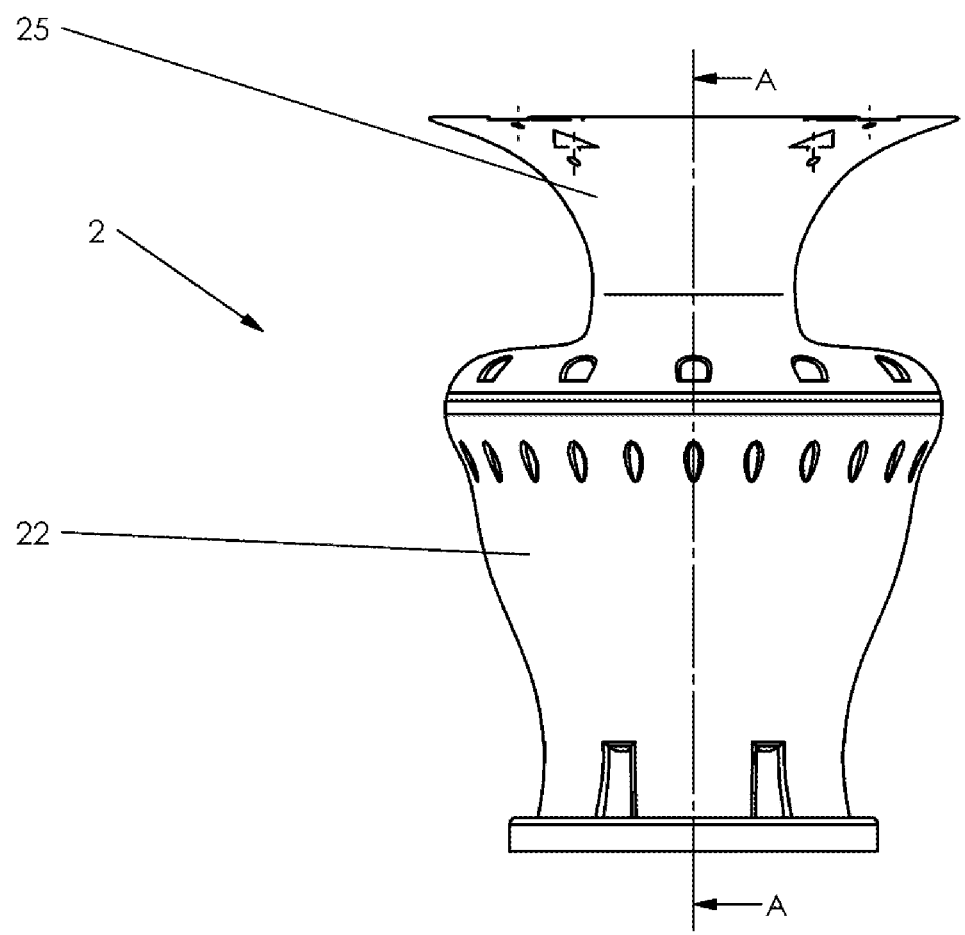
FIG. 4 is a side view of the air compressor assembly of FIG. 3.
Figure 5:
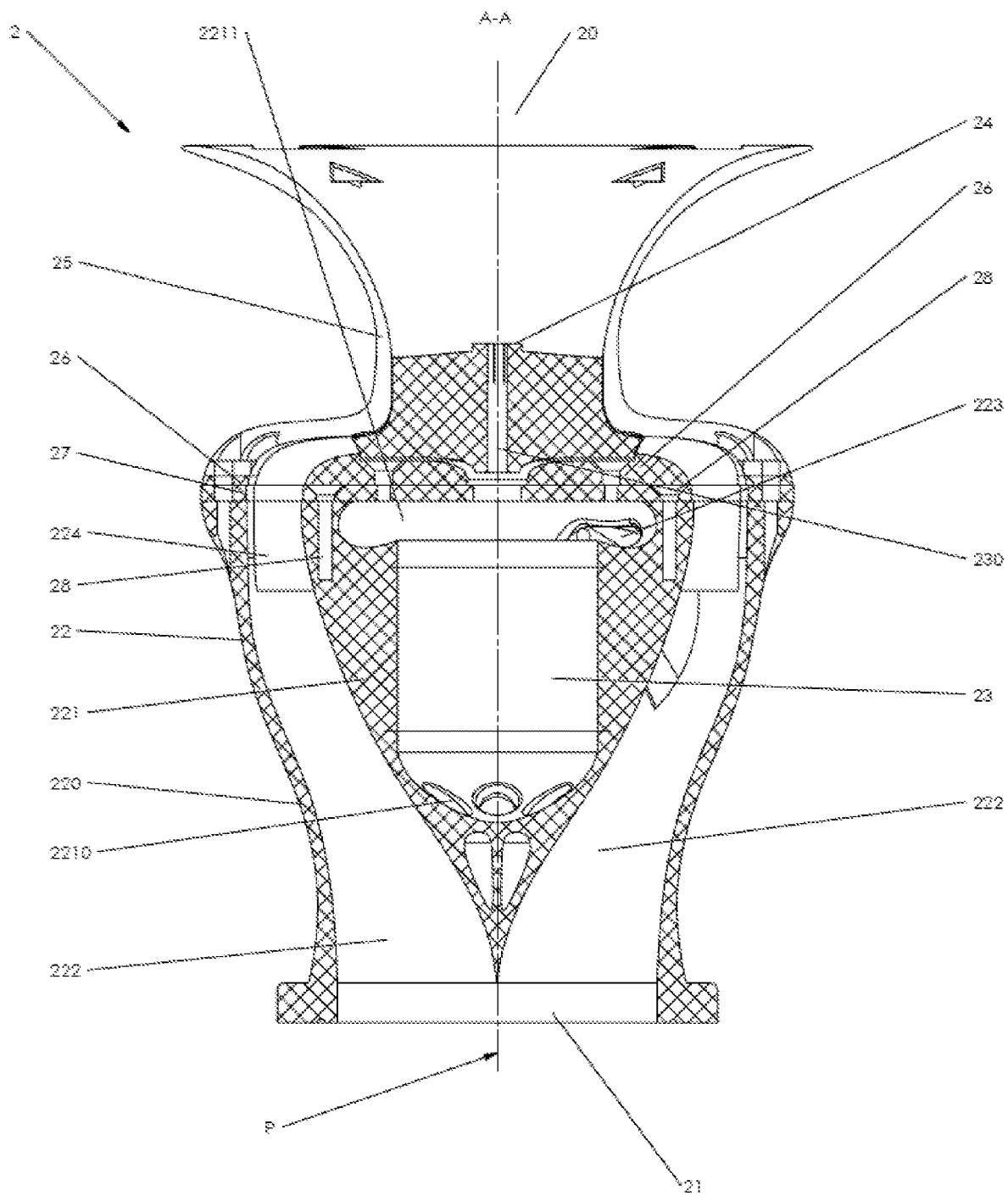
FIG. 5 is a cross-section view taken along the line A-A of the air compressor assembly of FIG. 4.
Figure 6:
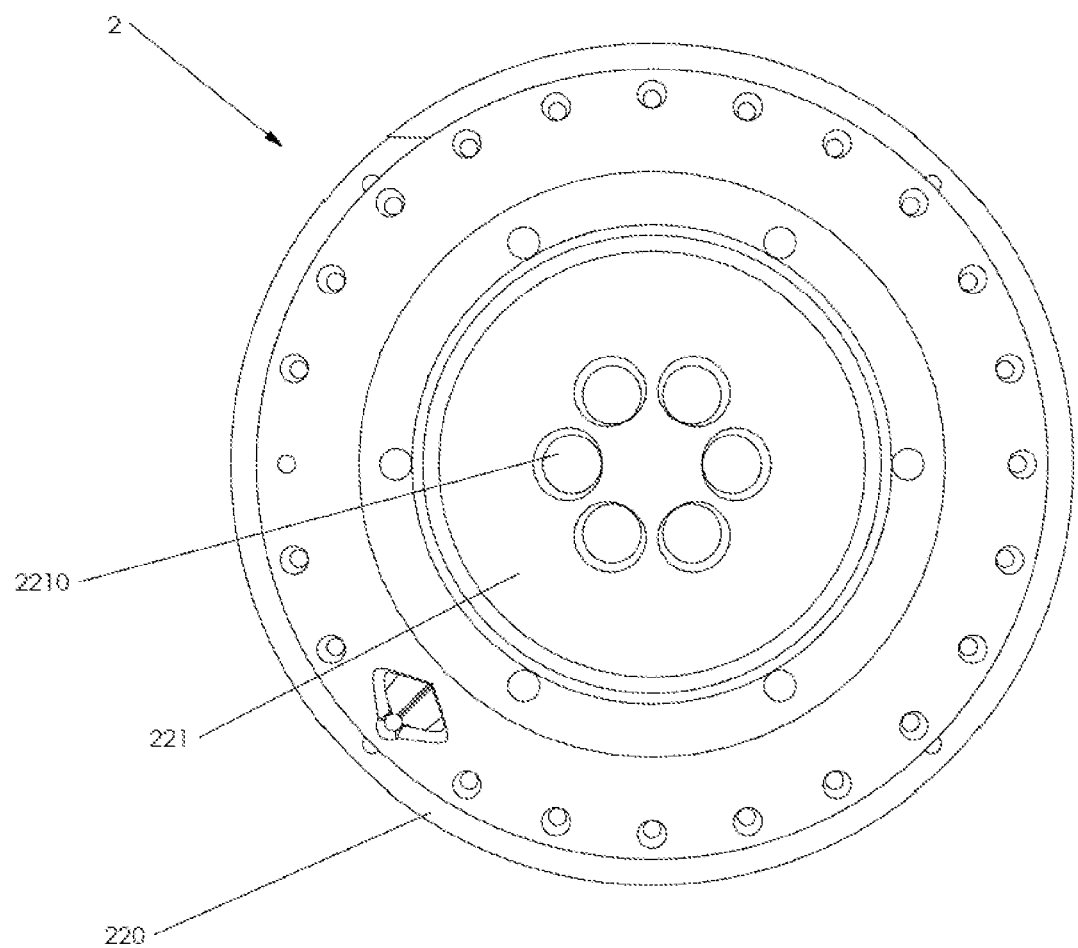
FIG. 6 is a bottom view of the air compressor assembly of FIG. 3.

FIG. 3 is a perspective view of the air compressor assembly of FIG. 1. FIG. 4 is a side view of the air compressor assembly of FIG. 3. FIG. 5 is a cross-section view taken along the line A-A of the air compressor assembly of FIG. 4. FIG. 6 is a bottom view of the air compressor assembly of FIG. 3.

Please refer to FIGS. 1-6 together. The air compressor assembly 2 includes an inlet opening 20, an outlet opening 21, a body 22, a motor 23, and a propeller 24. The inlet opening 20 is used for inhaling air into the burning apparatus 1, and the outlet opening 21 is used for communicating with the combustion assembly 3. The motor 23 includes a motor shaft 230 and is disposed in the body 22. The motor 23 drives the propeller 24 through the motor shaft 230. The inlet opening 20 may be configured to be any shape for guiding air into the inlet opening 20 of the air compressor assembly 2 and therefore into the body 22.

The body 22 is axially disposed along the axis P. The body 22 comprises an outer housing 220, an inner housing 221, and an air passage 222. Specifically, the inner housing 221 is disposed in the outer housing 220 and is connected to the outer housing 220 of the body 22. The motor 23 is disposed in the inner housing 221 of the body 22. The inner housing 221 and the outer housing 220 define an air passage 222 therebetween. The propeller 24 guides air from the air compressor assembly 2 into the combustion assembly 3 through the air passage 222. Namely, the inlet opening 20, an outlet opening 21, and the air passage 222 allow air to flow therethrough.

To avoid the turbulence of the air in the burning apparatus 1, the body 22 of a preferred embodiment also includes a rib 224 or multiple ribs 224 for realizing a more laminar flow motion of air in the air passage 222 and for reinforcing the connection between the outer housing 220 and the inner housing 221. In a preferred embodiment, the ribs 224 may fully or partially extend between the outer housing 220 and the inner housing 221 in the air passage 222.

To facilitate the compression and transmission of air into the inlet opening 300 of the combustion assembly 3, the air compressor assembly 2 further comprises a hood 25 configured for guiding and sucking air into the inlet opening 20 of the air compressor assembly 2. The hood 25 is also axially disposed along the axis P and adapted to the propeller 24 to collect and optimize air transmission into the burning apparatus 1. In a preferred embodiment, the hood 25 is configured to be shaped for optimally guiding the air from the propeller 24 into the air passage 222 of the body 22 of the air compressor assembly 2.

To strengthen the connection and assembling of the body 22 and the hood 25, the air compressor assembly 2 further comprises a plastic mounting plate 26 and a metal mounting plate 27. The plastic mounting plate 26 and the metal mounting plate 27 include openings to let air go into the air passage 222 of the air compressor assembly 2. The plastic mounting plate 26 is for receiving the propeller 24 and disposed between the hood the metal mounting plate 27, and the body 22. In a preferred embodiment, the plastic mounting plate 26 includes a propeller guiding feature to realize a more laminar flow of the air. The metal mounting plate 27 is disposed between the plastic mounting plate 26 and the body 22. Several screws 28 are used for the connection between the plastic mounting plate 26, the metal mounting plate 27, the hood 25, and the body 22 of the air compressor assembly 2, improving the stability of the air compressor assembly 2. In a preferred embodiment, the body 22 of the air compressor assembly 2 can be constructed as integral, and the hood 25 and the body 22 can be constructed as integral. In a preferred embodiment, the air compressor assembly 2 and the combustion assembly 3 can be constructed as integral.

A motor of a conventional burning apparatus 1 usually has a problem in heat dissipation when the motor works. The burning apparatus 1 is designed to have a cooling feature. Specifically, the inner housing 221 of the body 22 includes an inner housing opening 2210 which allows air to flow from the air passage 222 into the inner housing 221 for cooling the motor 23. So, the air in the air compressor assembly 2 is fully circulated. In addition, the inner housing 221 also includes a cavity 2211 for optimizing the flow path of the cooling air. Also, the body 22 includes a wire channel 223 passing through the outer housing 220 and the inner housing 221 to receive a wire of the motor 23 and/or to release the cooling air which also cools down the wire of motors 23 accordingly. The wire channel 223 and the cavity 2211 are communicated.

Figure 7:
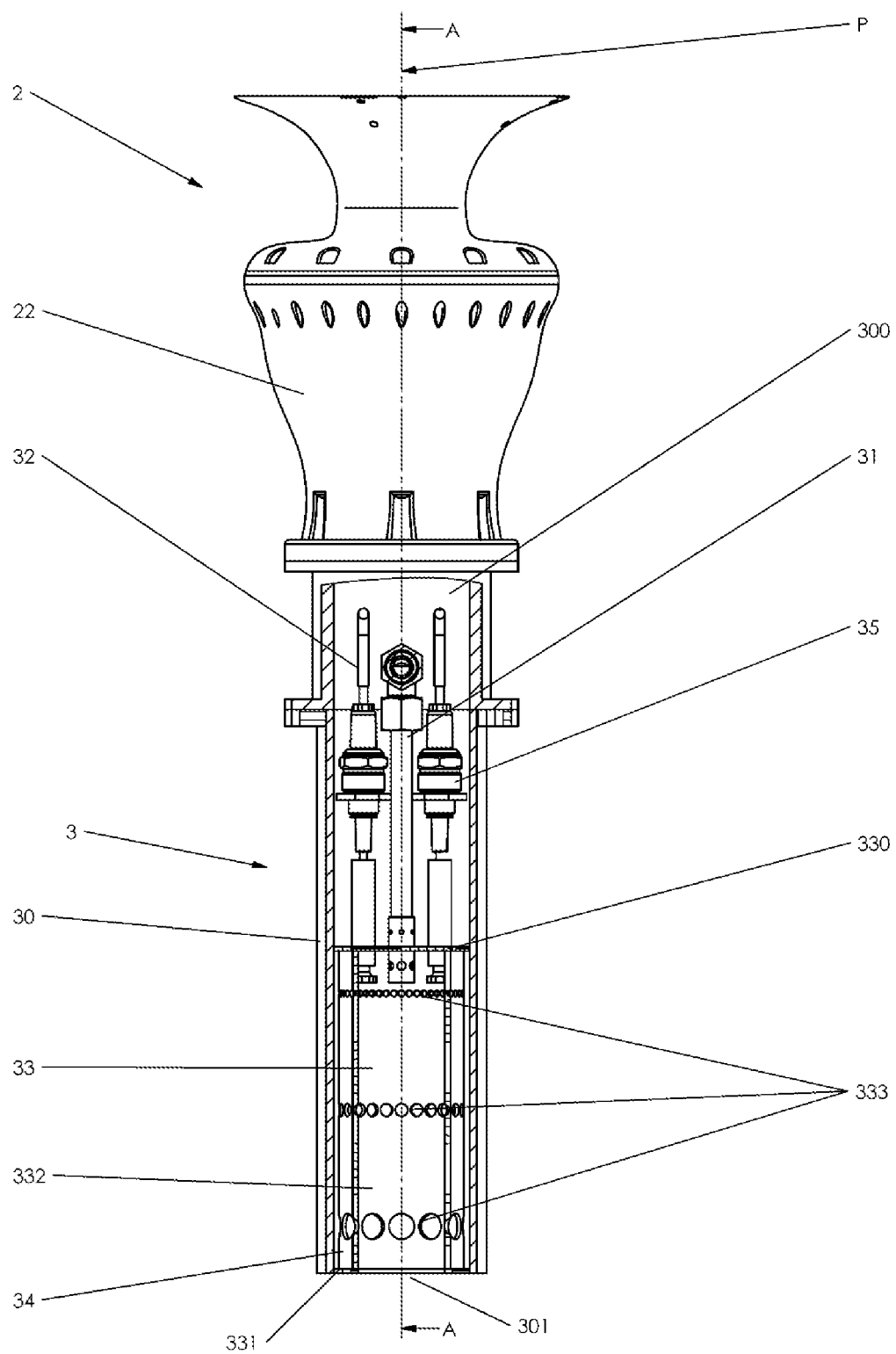
FIG. 7 is a partial cross-section view taken along the line A-A of the burning apparatus of FIG. 2.
Figure 8:
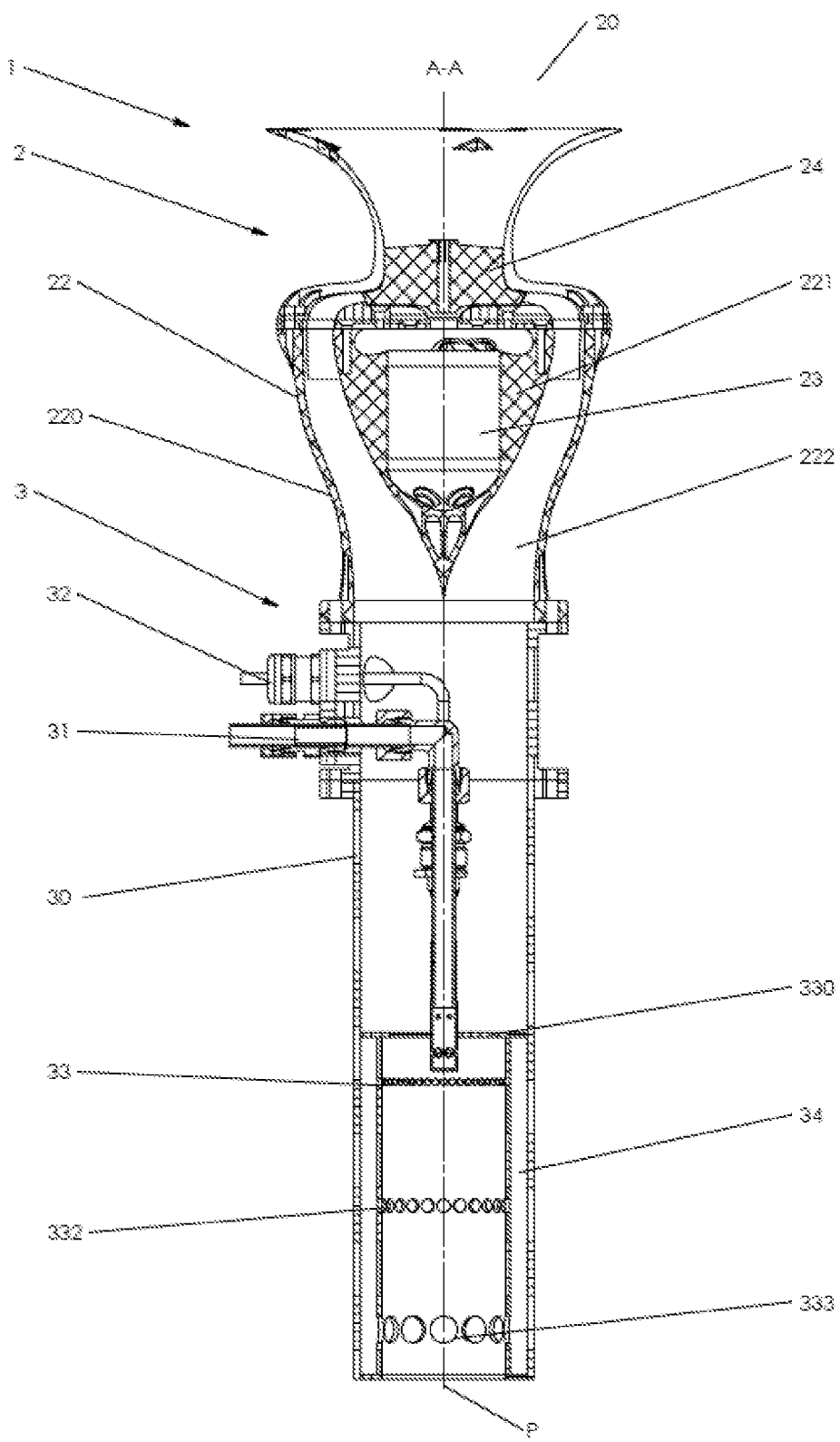
FIG. 8 is a cross-section view taken along the line A-A of the burning apparatus of FIG. 7.
Figure 9:
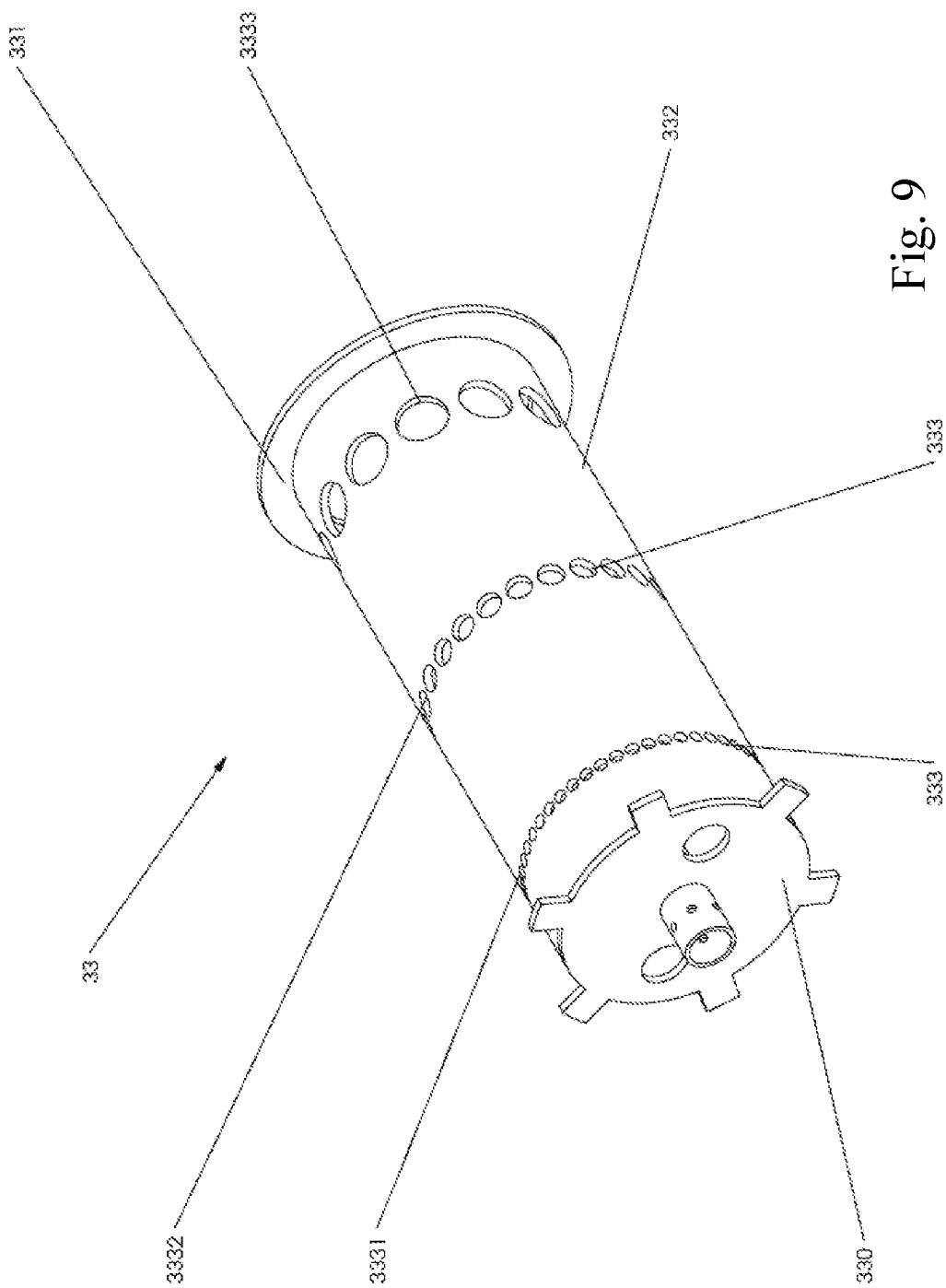
FIG. 9 is a perspective view of the burning tube assembly of the combustion assembly of the burning apparatus of FIG. 1.
Figure 10:
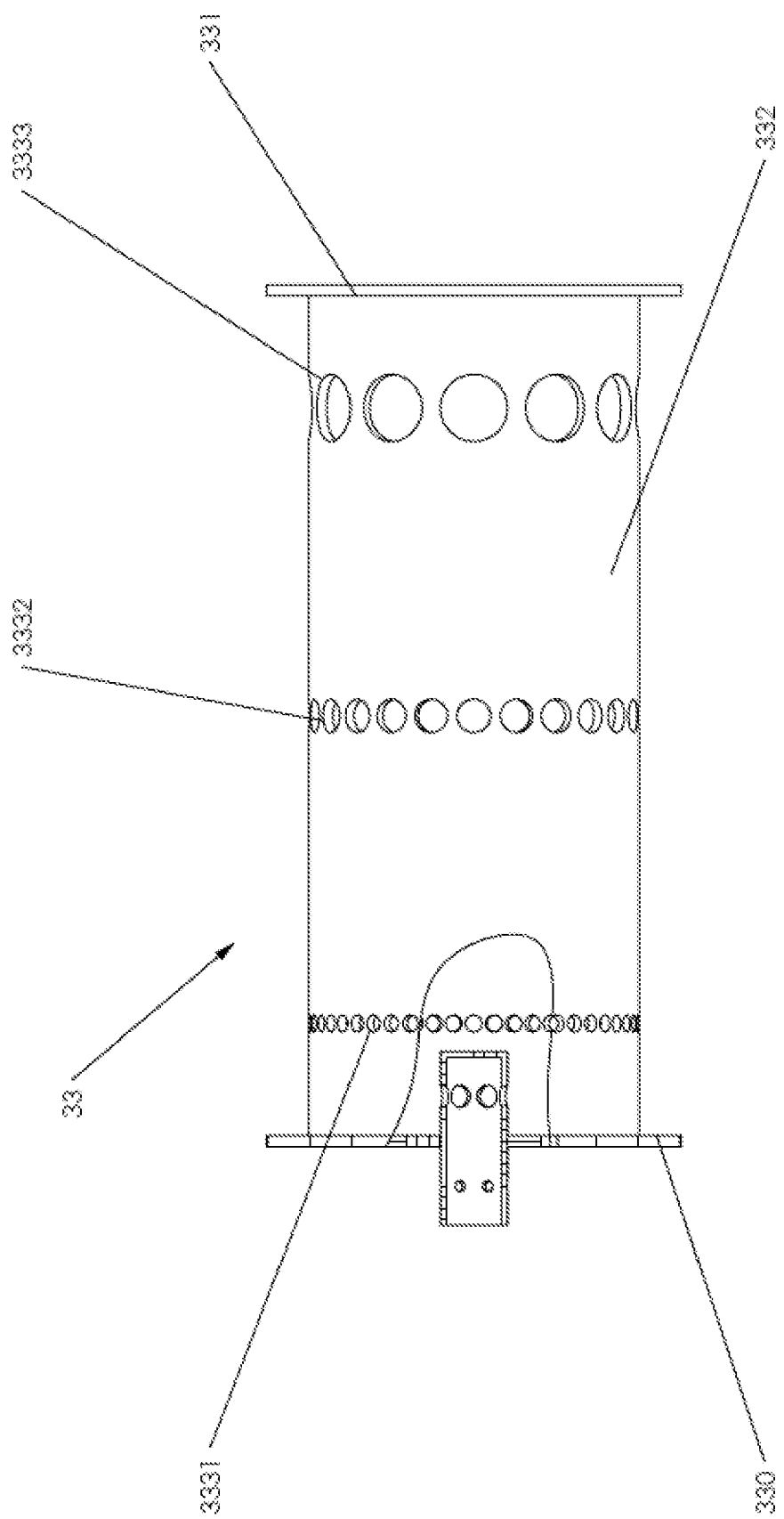
FIG. 10 is a side view of the burning tube assembly of FIG. 9.
Figure 11:
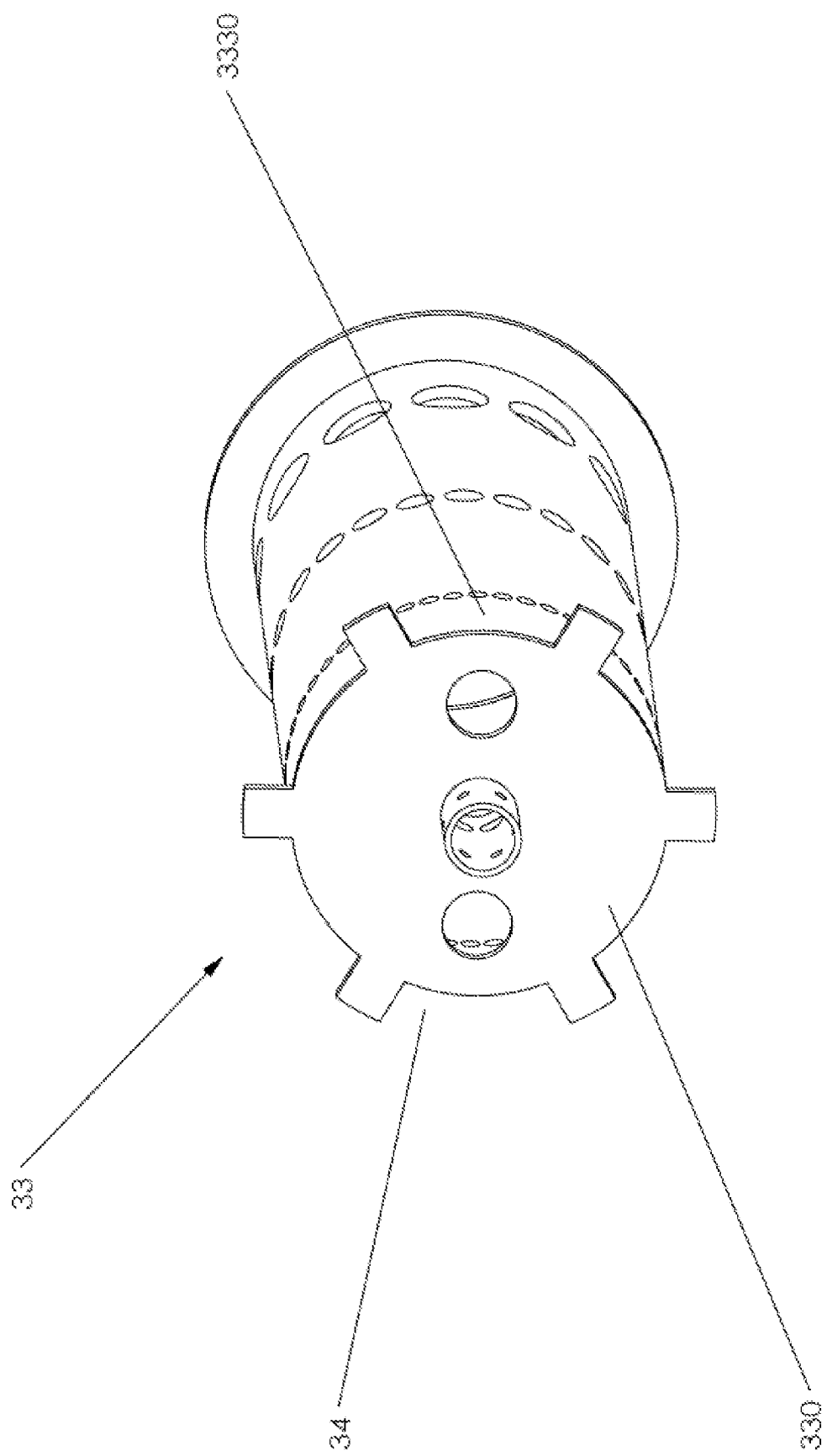
FIG. 11 is a perspective view of the burning tube assembly of FIG. 10.
Figure 12:
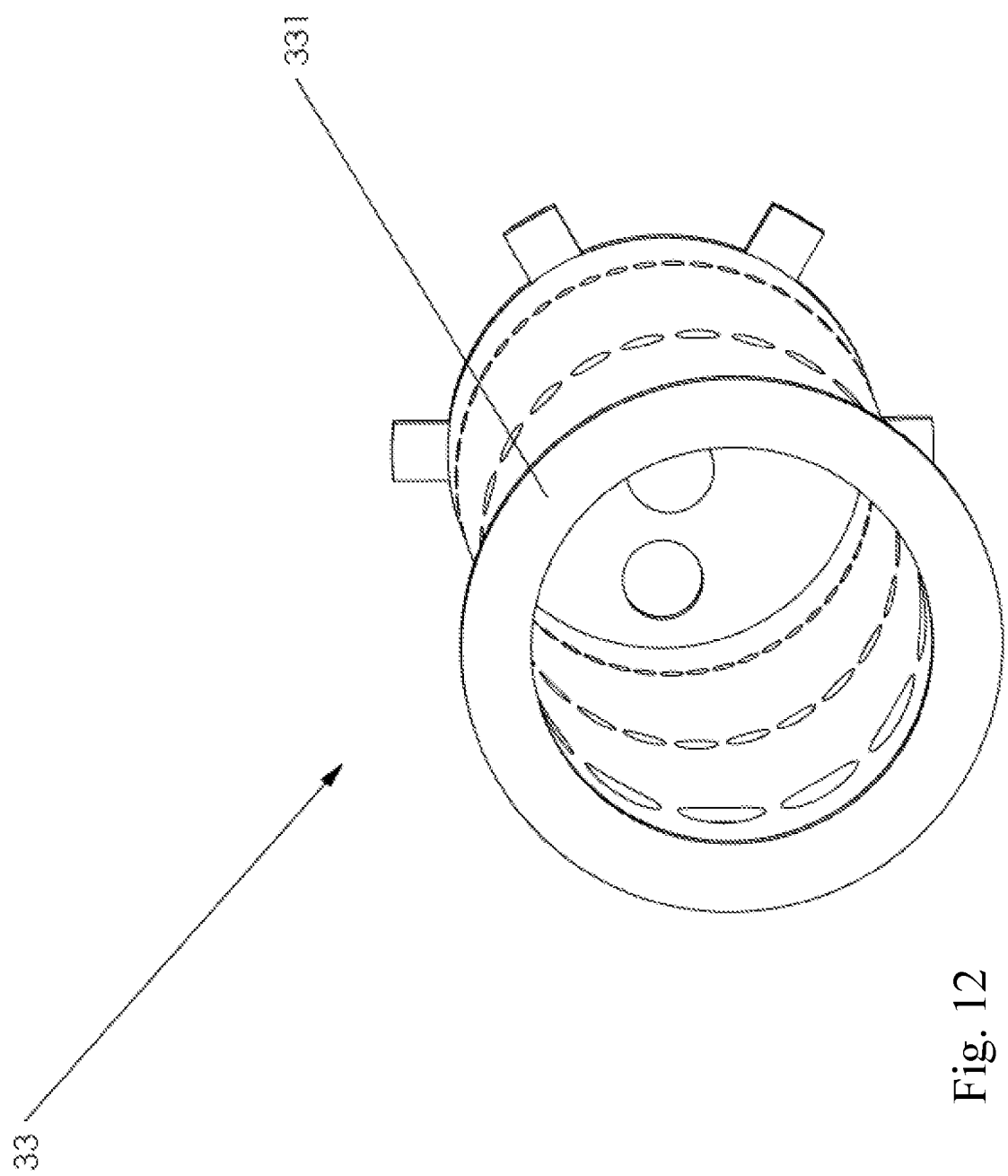
FIG. 12 is another perspective view of the burning tube assembly of FIG. 10.
Figure 13:
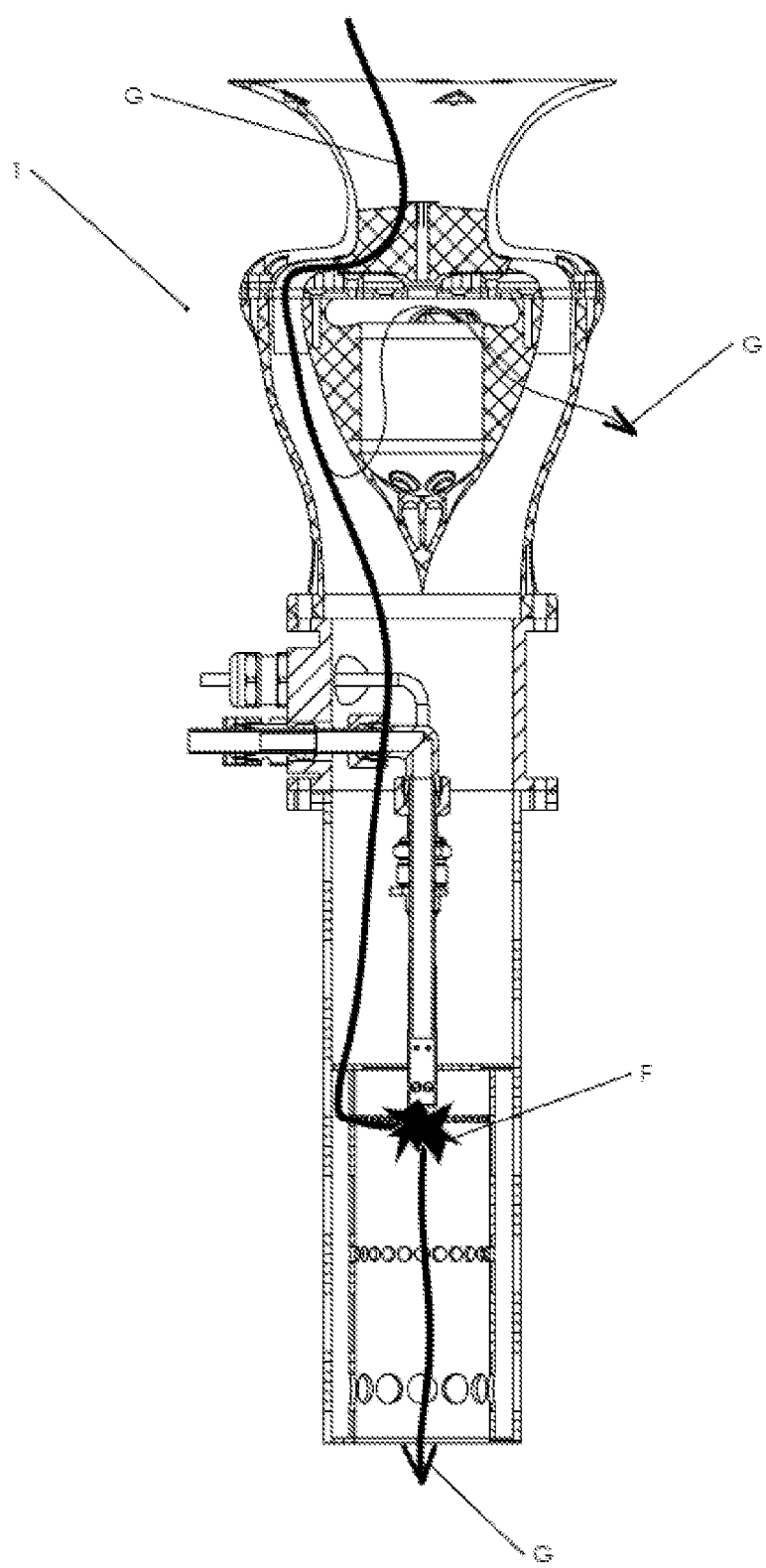
FIG. 13 is a cross-section view taken along the line A-A of the burning apparatus of FIG. 7, showing the airflow.

FIG. 7 is a partial cross-section view taken along the line A-A of the burning apparatus of FIG. 2. FIG. 8 is a cross-section view taken along the line A-A of the burning apparatus of FIG. 7. FIG. 9 is a perspective view of the burning tube assembly of the combustion assembly of the burning apparatus of FIG. 1. FIG. 10 is a side view of the burning tube assembly of FIG. 9. FIG. 11 is a perspective view of the burning tube assembly of FIG. 10. FIG. 12 is another perspective view of the burning tube assembly of FIG. 10. FIG. 13 is a cross-section view taken along the line A-A of the burning apparatus of FIG. 7, showing the airflow.

Please refer to FIGS. 1-13 together. The combustion assembly 3 includes a combustion assembly housing 30, a fuel means 31, an ignition means 32, and a burning tube assembly 33. The combustion assembly housing 30 may be configured to be a tube and is connected to the air compressor assembly 2. The combustion assembly housing 30 also includes an inlet opening 300 and an outlet opening 301. The inlet opening 300 of the combustion assembly housing 30 communicates with the outlet opening 21 of the air compressor assembly 2, so air can be blown into the combustion assembly 3. The fuel means 31 is for providing fuel into the combustion assembly 3. The fuel can be any flammable fuel, gas, or liquid for combustion, such as propane, butane, or hydrogen. A fuel providing device 4 can be arranged for storing fuel and be connected to the fuel means 31 by a hose (not shown in the drawings). For example, the fuel providing device 4 can be a fuel tank or a gas cylinder. Similarly, the ignition means 32 is for igniting the fuel and is connected to an external electrical device 5. For example, the external electrical device 5 can be an electrical generator or a power source providing a desired voltage. When the ignition means 32 ignites the fuel in the combustion assembly 3 to produce a flame F, the air compressor assembly 2 blows the flame F out of the outlet opening 301 of the combustion assembly 3.

In another preferred embodiment, combustion takes place in a burning tube assembly 33. The burning tube assembly 33 is disposed in the combustion assembly housing 30 of the combustion assembly 3, and is preferably near the lower part of the combustion assembly housing 30 of the combustion assembly 3. Specifically, the burning tube assembly 33 includes a burning tube body 332, an inlet disc 330, and an outlet disc 331. The detail of the burning tube assembly 33 is provided as follows.

The burning tube body 332 is configured to be hollow, and is disposed along the axis P and in the combustion assembly housing 30 and between the inlet disc 330 and the outlet disc 331. The burning tube assembly 33 is preferably located near the bottom of the combustion assembly housing 30 of the combustion assembly 3. The burning tube body 332 and the combustion assembly housing 30 define an air channel 34 therebetween. In a preferred embodiment, the burning tube body 332 further includes openings 333 designed along the burning tube body 332 to control the amount of air entering from the air channel 34 into the burning tube body 332. The inlet disc 330 contains holes for receiving the fuel means 31 and the ignition means 32. Additionally, the inlet disc 330 contains openings 3300 to allow air to enter the air channel 34. So, the air flowed from the air compressor assembly 2 into the air channel 34 of the combustion assembly 3 via the openings 3300 of the inlet disc 330. On the other hand, the outlet disc 331 is formed as a circular disc for sealing the bottom of the air channel 34, while the outlet disc 331 leaves the bottom of the burning tube body 332 open, so a flame F ejects out of the burning apparatus 1. As a result, the air passage 222 of the air compressor assembly 2, the openings 3300 of the inlet disc 330, the air channel 34 of the combustion assembly 3, the openings 333 of the burning tube body 332, and the outlet opening 301 of the combustion assembly 3 are designed to be communicated for the airflow G (please see the airflow G of FIG. 13).

The fuel means 31 and the ignition means 32 extend into the burning tube body 332 through the holes of the inlet disc 330. Hence, the fuel is provided in the burning tube body 332, and the combustion of the mixture of the fuel and oxygen ignited by the ignition means 32 happens in the burning tube body 332. In a preferred embodiment, the fuel means 31 may be a fuel tube for transmitting fuel, and the ignition means 32 may be an ignition electrode. The fuel means 31 and the ignition means 32 may extend from the outside of the burning tube assembly 33 into the burning tube body 332 and fixed at the inlet disc 330, so the fuel means 31 and the ignition means 32 can limit the reaction of the combustion in the burning tube body 332. In another preferred embodiment, the fuel means 31 and the ignition means 32 may be included in the air compressor assembly 2.

To further optimize the cooling effect of the burning tube assembly 33 and improve the efficiency of the combustion, the openings 333 of the burning tube body 332 closer to the inlet disc 330 may be designed to be smaller than the openings 333 of the burning tube body 332 closer to the outlet disc 331. For example, the openings 333 of the burning tube body 332 can be the first set openings 3331, the second set openings 3332, and the third set openings 3333. The first set openings 3331 are located near the inlet disc 330; the third set openings 3333 near the outlet disc 331; the second set openings 3332 are at somewhere between the first set openings 3331 and the third set openings 3333. Namely, the first set openings 3331 near the inlet disc 330 are smaller than the third set openings 3333 near the outlet disc 331. This leads to the following benefits. First, the smaller first set openings 3331 limit the amount of air entering the first set openings 3331 and allow more air flowing in the air channel 34 down to the third set openings 3333 along the burning tube body 332, so that air can cool down the burning tube body 332 as well as the combustion assembly housing 30. Second, the size of the smaller first set openings 3331 allows more converged air to enter the burning tube body 332. This can stabilize the formation of a converged flame F in the burning tube body 332. The flame F formed near the inlet disc 330 is preferably to be stable and converged. Third, the combustion of fuel needs merely a small amount of oxygen, so the smaller first set openings 3331 can maintain the small amount of air and oxygen entering the burning tube assembly 33 to achieve the desired amount and shape of a flame. A preferred flame is slim and thin. Fourth, the bigger third set openings 3333 at the outlet disc 331 help blowing the combusted flame F out of the outlet end of the burning tube assembly 33. The second set opening 3332 and the third set openings 3333 allow more oxygen to enter the burning tube body 332, ensuring a better mixing of the fuel and oxygen and pushing the flame F from the burning tube body 332 towards the axis P and thus towards the outlet opening 301. The burning tube assembly 33 leads to minimal contact of the flame F with the burning tube body 332, so the burning apparatus 1 and the combustion assembly 3 are cooled down during the operation of the burning apparatus 1.

To ensure the safety of the combustion, the combustion assembly 3 includes a sensor 35 for monitoring and detecting the formation of flame F. Specifically, a welding operator may operate the burning apparatus 1 together with the sensor 35 with the following steps: (A) activate the air compressor assembly 2, (B) activate the ignition means 32, (C) provide fuel by the fuel means 31, and (D) detect the presence of the flame F by the sensor 35. If there is no flame detected by the sensor 35, a welding operator checks or restarts the burning apparatus 1 to ensure the safe operation.

Figure 14:
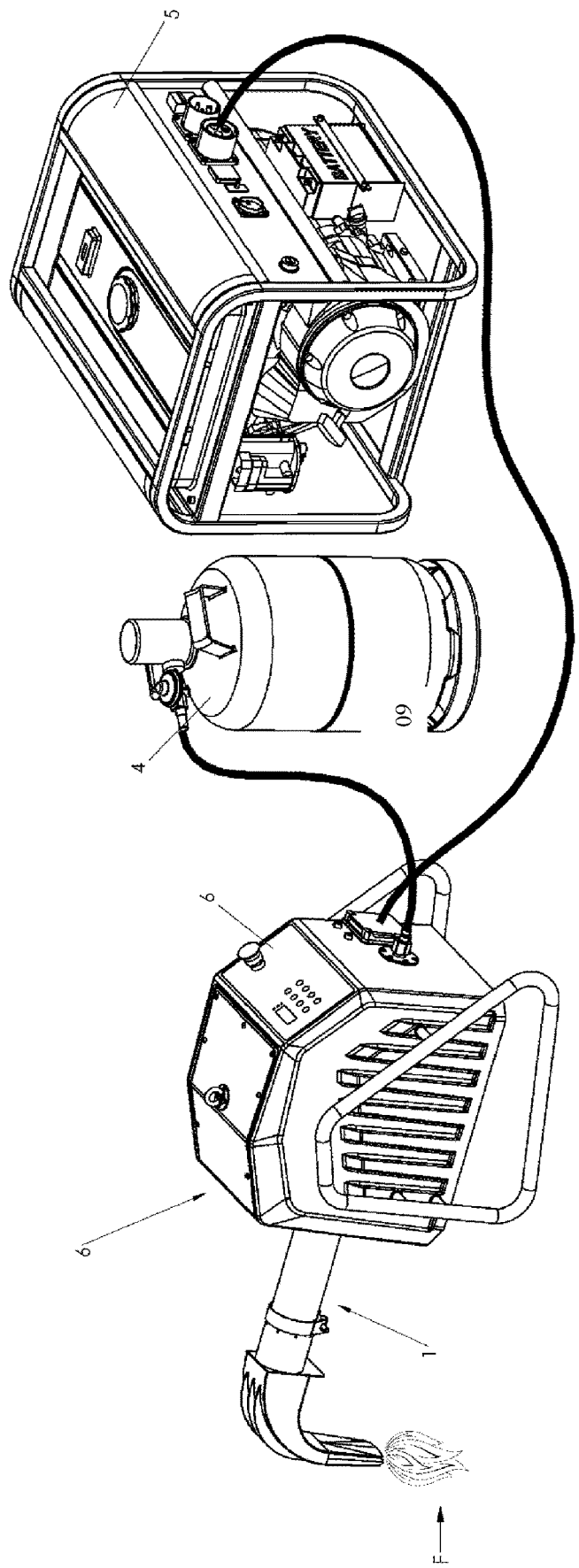
FIG. 14 is a perspective view of the preheating device equipped with the burning apparatus of FIG. 1.

FIG. 14 is a perspective view of the preheating device equipped with the burning apparatus of FIG. 1. A preheating device 6 for heating molds for railway repair comprises a preheating device body 60 and the burning apparatus 1. The burning apparatus 1 is disposed in the preheating device body 60 with the axis P aligning with the railway tracks. So, a welding operator can operate the preheating device 6 to heat the railway tracks.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

LIST OF ELEMENTS 1 burning apparatus
2 air compressor assembly
20 inlet opening
21 outlet opening
22 body
220 outer housing
221 inner housing
2210 inner housing opening
2211 cavity
222 air passage
223 wire channel
224 rib
23 motor
230 motor shaft
24 propeller
25 hood
26 plastic mounting plate
27 metal mounting plate
28 screw
3 combustion assembly
3 combustion assembly housing
300 inlet opening
301 outlet opening
31 fuel means
32 ignition means
33 burning tube assembly
330 inlet disc
3300 openings of the inlet disc
331 outlet disc
332 burning tube body
333 openings
3331 first set openings
3332 second set openings
3333 third set openings
34 air channel
35 sensor
4 fuel providing device
5 electrical device
6 preheating device
60 preheating device body
F flame
P axis
G airflow

The invention claimed is:

1. A burning apparatus configured to provide heat for railway repair, defining an axis (P) and comprising:
a combustion assembly including an outlet opening configured to heat a railroad track, the combustion assembly being configured to ignite a fuel to produce a flame, and
an air compressor assembly including an inlet opening and an outlet opening,
the combustion assembly being connected to the outlet opening of the air compressor assembly,
wherein the air compressor assembly and the combustion assembly are axially disposed along the axis (P), and wherein the air compressor assembly compresses air into the combustion assembly,
wherein the air compressor assembly further comprises:
a body axially disposed along the axis (P),
a motor including a motor shaft and disposed in the body, and
a propeller driven by the motor through the motor shaft and guiding air into the body,
wherein the body comprises:
an outer housing, and
an inner housing disposed in the outer housing and connected to the outer housing, the motor disposed therein,
wherein the inner housing and the outer housing define an air passage therebetween, and the propeller guides air from the air compressor assembly into the combustion assembly through the air passage.

2. The burning apparatus of claim 1, wherein the body further includes a rib connecting between the outer housing and the inner housing in the air passage.

3. The burning apparatus of claim 1, wherein the air compressor assembly further comprises a hood configured for guiding air into the inlet opening of the air compressor assembly.

4. The burning apparatus of claim 3, wherein the air compressor assembly further comprises:
a plastic mounting plate receiving the propeller and disposed between the hood and the body, and
a metal mounting plate disposed between the plastic mounting plate and the body to strengthen the air compressor assembly.

5. The burning apparatus of claim 1, wherein the inner housing of the body includes an inner housing opening which allows air to flow from the air passage into the inner housing for cooling the motor.

6. The burning apparatus of claim 1, wherein the combustion assembly includes:
a combustion assembly housing including an inlet opening and an outlet opening, the inlet opening of the combustion assembly housing communicating with the outlet opening of the air compressor assembly,
a fuel means for providing fuel into the combustion assembly, and
an ignition means for igniting fuel,
wherein the ignition means ignites the fuel in the combustion assembly to produce the flame.

7. The burning apparatus of claim 2, wherein the air compressor assembly further comprises a hood configured for guiding air into the inlet opening of the air compressor assembly.

8. The burning apparatus of claim 2, wherein the air compressor assembly further comprises:
a plastic mounting plate receiving the propeller and disposed between the hood and the body, and
a metal mounting plate disposed between the plastic mounting plate and the body to strengthen the air compressor assembly.

9. The burning apparatus of claim 2, wherein the inner housing of the body includes an inner housing opening which allows air to flow from the air passage into the inner housing for cooling the motor.

10. The burning apparatus of claim 2, wherein the combustion assembly includes:
a combustion assembly housing including an inlet opening and an outlet opening, the inlet opening of the combustion assembly housing communicating with the outlet opening of the air compressor assembly,
a fuel means for providing fuel into the combustion assembly, and
an ignition means for igniting fuel,
wherein the ignition means ignites the fuel in the combustion assembly to produce a flame.

11. A burning apparatus for railway repair, defining an axis (P) and comprising:
an air compressor assembly including an inlet opening and an outlet opening, and
a combustion assembly connected to the outlet opening of the air compressor assembly,
wherein the air compressor assembly and the combustion assembly are axially disposed along the axis (P), and
wherein the air compressor assembly compresses air into the combustion assembly,
wherein the air compressor assembly further comprises:
a body axially disposed along the axis (P),
a motor including a motor shaft and disposed in the body, and
a propeller driven by the motor through the motor shaft and guiding air into the body,
wherein the body comprises:
an outer housing, and
an inner housing disposed in the outer housing and connected to the outer housing, the motor disposed therein,
wherein the inner housing and the outer housing define an air passage therebetween, and the propeller guides air from the air compressor assembly into the combustion assembly through the air passage;
wherein the combustion assembly further includes a burning tube assembly disposed in the combustion assembly housing, the burning tube assembly comprising:
an inlet disc,
an outlet disc, and
a burning tube body configured to be hollow and disposed along the axis (P) in the combustion assembly housing and between the inlet disc and the outlet disc,
wherein the burning tube body and the combustion assembly housing define an air channel therebetween, and
wherein the air passage of the air compressor assembly, the air channel of the combustion assembly, the burning tube body, and the outlet opening of the combustion assembly are designed to be communicated.

12. The burning apparatus of claim 11, wherein the burning tube body includes openings designed along the burning tube body to control the amount of air entering from the air channel into the burning tube body, wherein the combustion of the mixture of the fuel and air happens in the burning tube body.

13. The burning apparatus of claim 12, wherein the openings of the burning tube body closer to the inlet disc are designed to be smaller than the openings of the burning tube body closer to the outlet disc.

14. The burning apparatus of claim 6, wherein the combustion assembly includes a sensor for monitoring and detecting the presence of flame.

15. The burning apparatus of claim 6, wherein the fuel means is connected to a fuel providing device, and the ignition means is connected to an electrical device.

16. The burning apparatus of claim 3, wherein the body of the air compressor assembly is constructed as integral, and the hood and the body are constructed as integral.

17. The burning apparatus of claim 1, wherein the air compressor assembly and the combustion assembly are constructed as integral.

18. The burning apparatus of claim 6, wherein the air compressor assembly and the combustion assembly are constructed as integral.

19. A preheating device for railway repair, comprising:
a preheating device body, and
the burning apparatus of claim 1 disposed in the preheating device,
wherein the preheating device is operated on the railway tracks to heat the railway.

20. A preheating device for railway repair, comprising:
a preheating device body, and
the burning apparatus of claim 2 disposed in the preheating device,
wherein the preheating device is operated on the railway tracks to heat the railway.

21. A preheating device for railway repair, comprising:
a preheating device body, and
a burning apparatus disposed in the preheating device, comprising:
- an air compressor assembly including an inlet opening and an outlet opening, and
- a combustion assembly connected to the outlet opening of the air compressor assembly,
- wherein the air compressor assembly and the combustion assembly are coaxially disposed, and wherein the air compressor assembly compresses air into the combustion assembly, wherein the air compressor assembly further comprises:
- a body,
- a motor including a motor shaft and disposed in the body, and
- a propeller driven by the motor through the motor shaft and guiding air into the body, wherein the body comprises:
- an outer housing, and
- an inner housing disposed in the outer housing and connected to the outer housing, the motor disposed therein,
- wherein the inner housing and the outer housing define an air passage therebetween, and the propeller guides air from the air compressor assembly into the combustion assembly through the air passage,
- wherein the preheating device is operated on a railway track to heat a railway.

22. The burning apparatus of claim 1, wherein the axis P is directed toward the railroad track.

* * * * *